US006929425B1

(12) United States Patent
Kimberlin et al.

(10) Patent No.: US 6,929,425 B1
(45) Date of Patent: Aug. 16, 2005

(54) EROSION CONTROL REINFORCEMENT MAT

(75) Inventors: Mark W. Kimberlin, Brawley, CA (US); Kurt Chirbas, Granite Bay, CA (US)

(73) Assignee: Greenfix America, Brawley, CA (US)

( * ) Notice: Subject to any disclaimer, the term of this patent is extended or adjusted under 35 U.S.C. 154(b) by 0 days.

(21) Appl. No.: 10/072,149

(22) Filed: Feb. 6, 2002

Related U.S. Application Data

(60) Provisional application No. 60/266,782, filed on Feb. 6, 2001.

(51) Int. Cl.[7] ............................................. C09K 17/00
(52) U.S. Cl. ................................ 405/302.4; 405/302.6
(58) Field of Search ............................ 405/32, 33, 15, 405/302.4, 302.6, 302.7

(56) References Cited

U.S. PATENT DOCUMENTS

| | | | |
|---|---|---|---|
| 4,181,450 A | | 1/1980 | Rasen et al. |
| 4,332,125 A | * | 6/1982 | Holdren ........................... 56/1 |
| 4,369,054 A | | 1/1983 | Shinholster, Jr. et al. |
| 4,572,700 A | | 2/1986 | Mantarro et al. |
| 4,635,576 A | | 1/1987 | Bowers |
| 4,662,778 A | | 5/1987 | Dempsey |
| 5,055,151 A | * | 10/1991 | Duffy .......................... 156/167 |
| 5,237,945 A | * | 8/1993 | White .......................... 112/420 |
| 5,257,878 A | * | 11/1993 | Peterson ....................... 405/15 |
| 5,421,123 A | * | 6/1995 | Sakate et al. .................... 47/56 |
| 5,651,641 A | * | 7/1997 | Stephens et al. ......... 405/302.6 |
| 5,786,281 A | * | 7/1998 | Prunty et al. ................ 442/104 |
| 5,849,645 A | | 12/1998 | Lancaster |

FOREIGN PATENT DOCUMENTS

| | | | | |
|---|---|---|---|---|
| JP | 06296402 A | * | 10/1994 | ............ A01C 1/04 |
| JP | 2001234540 A | * | 8/2001 | ........... E02D 17/20 |

OTHER PUBLICATIONS

Granite Seed Company, "Greenfix America" from http://web.archive.org/web/19990128060024/www.grantiteseed.com/erosion/index.html, Erosion Control Products, 2 pages, Jan. 28, 1999.*

* cited by examiner

*Primary Examiner*—Heather Shackelford
*Assistant Examiner*—Lisa M Saldano
(74) *Attorney, Agent, or Firm*—Stout, Uxa, Buyan & Mullins, LLP; Frank J. Uxa; Linda A. Fox

(57) ABSTRACT

An erosion control system is provided which generally includes a flexible composite blanket or matting including a core layer bonded between an upper and a lower netting material, and an upper layer made of a biaxial geogrid. The matting has a flat upper surface without any substantial three dimensional features in which to trap sediment. The matting has a relatively high aerial density of about 0.7 pounds per square yard.

20 Claims, 4 Drawing Sheets

EROSION CONTROL REINFORCEMENT MAT

RELATED APPLICATION

This application claims the benefit of U.S. provisional application Ser. No. 60/266,782 filed on Feb. 6, 2001.

BACKGROUND OF THE INVENTION

The present invention generally relates to erosion control matting, and more specifically relates to temporary or permanent turf reinforcement and soil retention matting.

Erosion control is an essential environmental consideration when new slope embankments and channels are created, for example during construction of buildings and drainage systems. Traditionally, newly constructed channels have been lined with concrete or rock to provide a hard, armor-like channel lining. Alternatively, the development of root reinforcement systems are relied upon to control erosion. Thus, methods have been developed for stabilizing soil on channel linings and other erosion prone surfaces by encouraging the growth of native or introduced vegetation along the surface. Ideally, a mature root system within the sloped surface functions to bond together the channel surface and inhibit soil loss during rains and other stresses.

However, embankment and channel surfaces often require reinforcement, particularly during the pre-vegetated stage and early stages of plant growth, to prevent loss of soil, seeds, seedlings and other small plants when the soil is in an unstable state.

Various reinforcement systems have been developed. For example, U.S. Pat. No. 5,849,645 to Lancaster, which is incorporated herein by this specific reference, discloses a reinforced composite matting including a fiber matrix secured together by an arrangement of multiple nettings. The nettings form a series of alternating troughs and ridges, from between one eight an inch in height to one inch in height, along the matting. This three dimensional, "cuspated" aspect of the Lancaster matting is designed to trap mulch, sediment, and plant seeds in the troughs during early stages of plant growth. According to Lancaster, the trapped soil and other debris provides a growing medium for sprouting plants. Although the Lancaster patent recognizes the problems associated with erosion on new channel surfaces, the matting system disclosed does not address other problems, for example, high shear stress on the matting, particularly during long duration, high velocity water flow during the critical pre-vegetated stage. Furthermore, the Lancaster system requires that the matting be placed in a specific alignment with respect to channel flow. More particularly, Lancaster discloses that in order for the matting to trap sediment between the troughs and ridges, the matting is to be installed such that the troughs and ridges are perpendicular to the intended direction of channel flow. This requirement poses potential installation problems and setbacks.

Conventional prior art erosion control blankets have utilized wheat straw, coconut fiber, chopped or crimped synthetic polypropylene fibers or a blend thereof. Wheat straw, in particular, has long been an industry standard. Erosion control blankets made primarily of wheat straw suffer a number of disadvantages. For example, the natural decomposition process of wheat straw tends to extract nitrogen and other plant nutrients from the soil surface to which the straw is applied, thus detrimentally affecting soil fertility. Plants and seedlings growing from the surface and through the wheat straw-based covering does not promote the optimal growth of plant roots, thus delaying or hindering the goal of soil stability. To counteract this effect, fertilizers and other such additives are oftentimes incorporated into the blanket material in an effort to maintain or boost soil fertility during the early stages of plant growth.

It will be appreciated by those of skill in the art, that the objectives of the present invention, for example, greater soil stability and establishment of foliage and a healthy root system, are essentially the same objectives to which conventional erosion control blankets have generally been directed. However, conventional erosion control blanket designs have been inadequate, particularly during high velocity, long term, sustained water flow conditions, and even more so when said blankets have been installed to a non-vegetated, bare or seeded soil surface.

There is still a need for a better erosion control product. The present invention provides a more effective, more technically advanced system for controlling soil loss erosion on channel and embankment surfaces, particularly during the critical pre-vegetation stage and in areas exposed to severe conditions of continuous, extended, high velocity water flows, and high shear stress erosion.

SUMMARY OF THE INVENTION

Accordingly, an erosion control system is provided, which generally comprises a flexible matting adapted to be secured to or placed on a sloped surface, for example a substantially non-vegetated surface.

In one particularly useful embodiment of the invention, the system comprises a erosion control matting structured to substantially prevent soil loss on a substantially unvegetated, sloped surface, even when the matting is exposed to high velocity and/or long duration hydraulic events. (This embodiment of the invention may be hereinafter sometimes referred to as the high velocity/long duration hydraulic event matting embodiment.) More particularly, this embodiment of the invention generally comprises a core layer formed of a a fiber matrix comprising randomly oriented fibers, and a upper layer, bonded or secured to the core layer, wherein the core layer and the upper layer define a substantially flat upper surface. A flat upper surface is more specifically defined herein as a surface being without substantial three-dimensional features such as cuspations, pockets, ridges, or the like. Advantageously, the matting of this embodiment of the present invention has a substantially higher mass unit density in comparison to conventional erosion control mats. Specifically, the matting has a mass unit density of at least about 0.5 pounds per square yard and more preferably at least about 0.7 pounds per square yard. In this embodiment of the present invention, the fiber matrix core preferably comprises a material selected from the group consisting of coconut fibers, flax fiber, polypropylene fibers, for example chopped polypropylene fibers, and combinations thereof.

In addition, the upper surface of the matting preferably has a Manning's "N" value of roughness of less than about 0.044, and preferably has a roughness value of about 0.026 or less. Advantageously, it has been found that during a storm event, the present system more effectively resists high shear stresses, such that high velocity liquid flow passes over the upper surface of the matting without substantially removing any of the soil beneath the matting. It is noted and will be appreciated by those of skill in the art, that conventional matting systems have typically been designed with substantial three dimensional features, primarily as a means of trapping soil during water flow over the surface of the matting. Although not wishing to be bound by any particular theory of operation, it is believed that the relatively flatter structure of the matting in accordance with the present invention contributes to the system being able to withstand higher flow velocities, by decreasing the high shear stress forces created, for example, by an increasing water depth flowing over a relatively rough surface.

In another embodiment of the present invention, an erosion control system is provided which generally comprises a flexible matting structured to be installed on a surface prone to erosion, the matting including a core layer formed of a fiber matrix comprising plant fibers that are effective in releasing beneficial nutrients to the sloped surface upon decomposition of the plant fibers over a period of time. The plant fibers of the core layer preferably have a nutrient content of at least about 0.6% potassium, about 1.25% nitrogen, and about 2.0% phosphate, based upon 100% dry matter. The fiber matrix is preferably substantially absent of wheat straw. Preferably, the fiber matrix core comprises Sudan Grass (*Sorgum Sudanese*).

In yet another embodiment of the invention, an erosion control system is provided, comprising a flexible matting structured to be secured or placed on a sloped surface prone to erosion, the matting including a core layer formed of rice straw fibers, for example, California Rice Straw.

The present system is installed to a surface using U-shaped staples or other conventional means.

Each and every feature described herein, and each and every combination of two or more such features is included within the scope of the invention provided that the features included in such combination are not mutually inconsistent.

The present invention and the objects and advantages thereof will be more clearly understood and appreciated with respect to the following Detailed Description, when considered in conjunction with the accompanying Drawings.

DETAILED DESCRIPTION OF THE INVENTION

Figure 1:
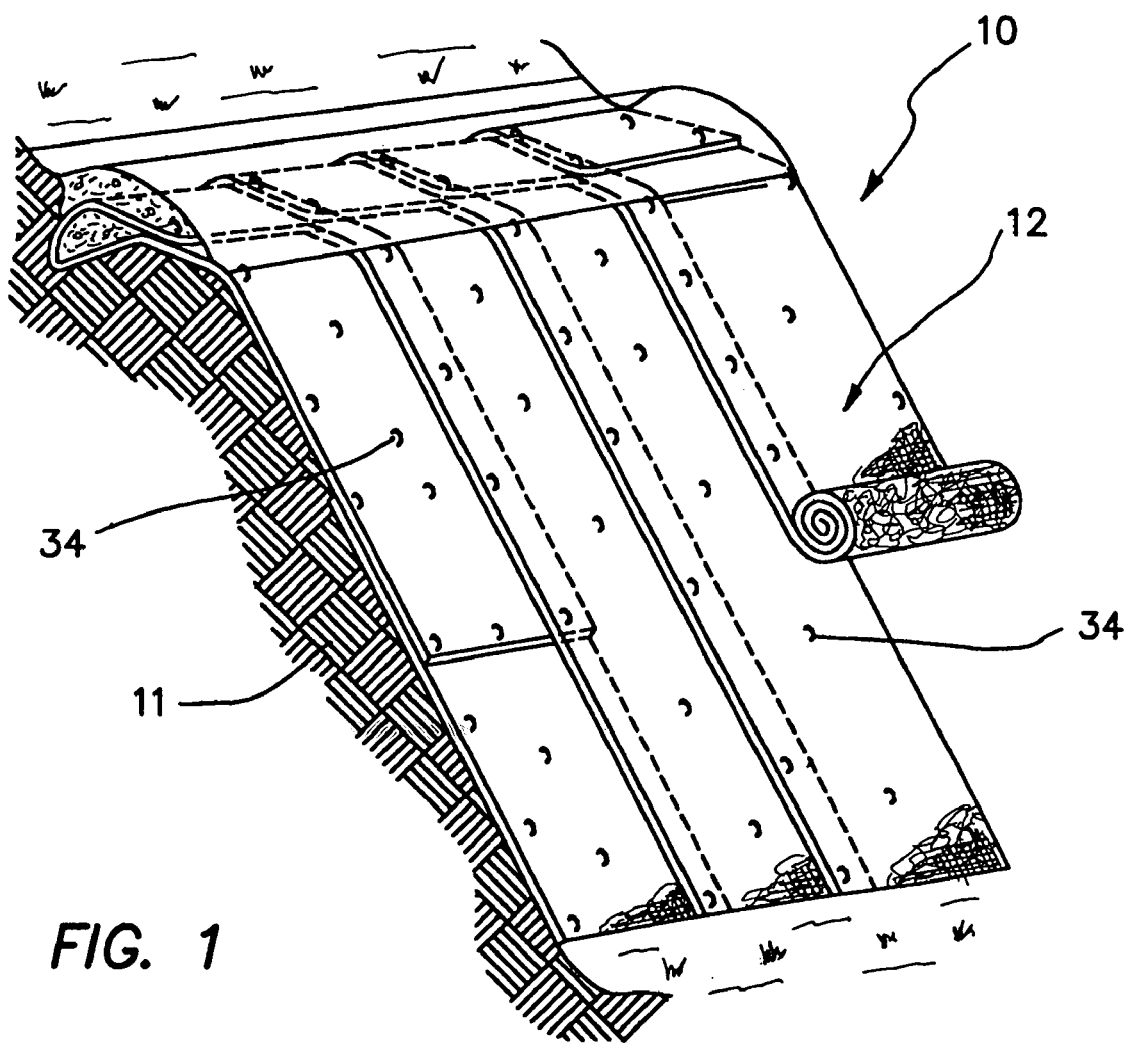
FIG. 1 shows a perspective view of an embodiment of the erosion control system of the present invention, comprising erosion control matting during installation of the matting to a non-vegetated, sloped soil surface to prevent soil erosion and for enhancing development of stabilizing vegetation on the sloped surface.

Turning to FIG. 1, an erosion control, surface reinforcement system, in accordance with the present invention, is shown generally at 10. The system 10 is shown during installation thereof to a surface that is prone to erosion, for example a sloped, bare earth newly constructed embankment surface 11. For example, the system is being installed on the sloped surface 11 that is prone to high velocity and/or high duration hydraulic events, in order to promote the eventual growth of stabilizing vegetation on the surface 11.

Figure 2:
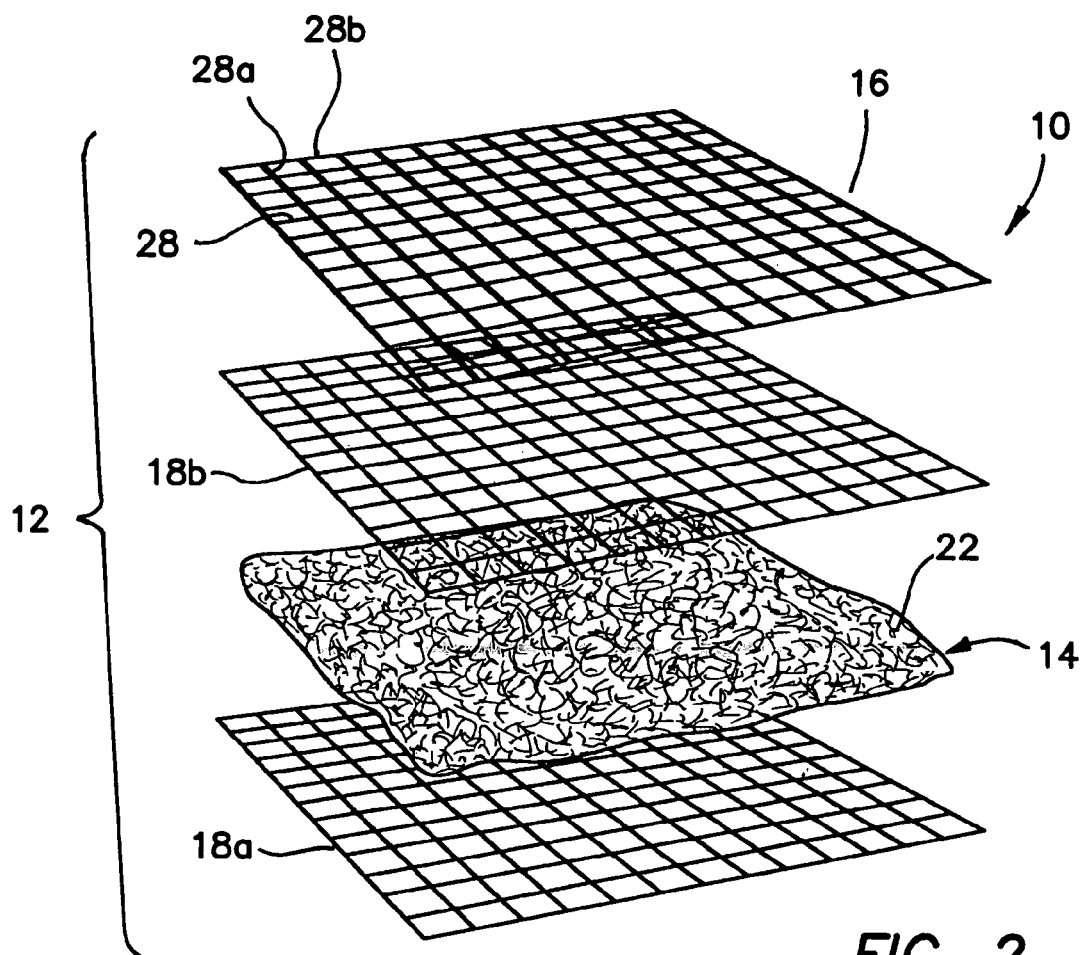
FIG. 2 shows an exploded view of a portion of the matting shown in FIG. 1.
Figure 3:
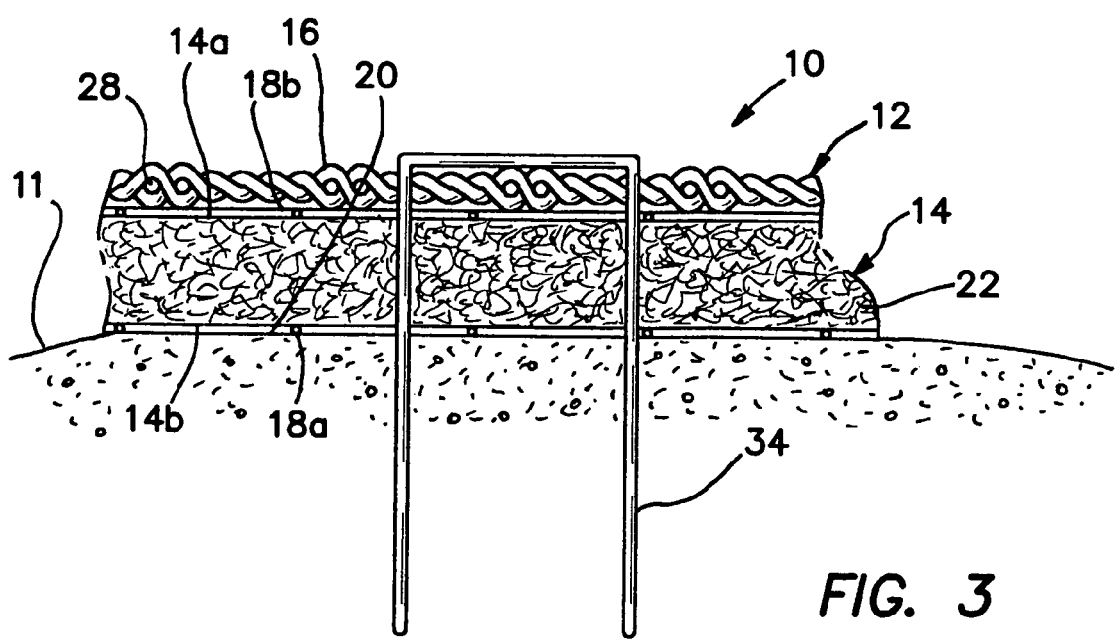
FIG. 3 shows a cross sectional view of the matting shown in FIG. 1.

Turning now to FIGS. 2 and 3, the system 10 generally comprises a flexible composite blanket, or matting 12, adapted to be temporarily or permanently placed on or secured to the surface 11. The surface 11 may be, for example, a newly constructed embankment, channel, a level or sloped bare earth or seeded surface. As will be appreciated by those of skill in the art, the slope of a channel surface is typically between about 3 to about 7 grade. Severe slope embankment angles are typically defined as 1:1 (45 degrees) or steeper.

The matting 12 generally comprises a flexible core layer 14 defining a lower surface 14a and a substantially flat upper surface 14b. The matting 12 further comprises an upper layer 16, secured to the substantially flat upper surface 14a of the core layer 14. The core layer 14 and the upper layer 16 define a substantially flat upper surface of the matting 12. In addition, the core layer 14 is preferably bonded between a bottom netting layer 18a and a top netting layer 18b. The netting layers 18a and 18b are preferably stitched together, compacting the core layer 16 therebetween, for example by means of a polypropylene monofilament thread 20.

In a preferred embodiment of the present invention, the matting 12 is structured to withstand continuous, as well as intermittent, liquid flow, for example, high velocity water flow, over the surface 11 on to which it is placed and/or secured. The matting 12 of the present invention is designed to be flatter and more flexible than conventional reinforcement matting while exhibiting superior, tensile strength properties. The matting 12, particularly an upper surface profile thereof, has no substantial three dimensional features such as grooves, troughs, cuspations, crimping, or other open structured, three-dimensional features.

Unlike prior art erosion control blankets, the present system 10 is not designed to trap sediment carried in water flowing over the surface thereof, but instead is designed to allow flowing water/particulate matter to pass freely, and with relatively low turbulence over the matting 12, while preventing soil loss from beneath the matting.

The upper layer 16 of the matting is essentially two-dimensional, and is bonded to the flat upper surface 14a of the core layer 14. The upper layer 16 overlies and substantially conforms to the flat surface profile of the fiber matrix layer 12.

In a preferred embodiment of the invention, the core layer 14 is formed of a flexible fiber matrix 22, preferably comprising randomly oriented, natural plant fibers, densely packed between the lower netting layer 18a and the upper netting layer 18b. In addition, the core layer 14 has a substantially uniform thickness, preferably at least about 0.3 inches, preferably in a range of between about 0.3 inches to about 0.5 inches, or in a range of between about 0.7 inches to about 1.0 inches. When confined by the netting structure 20, the core layer 12 forms a relatively dense, uniform layer without troughs, ridges or other similar contoured, open structured or three dimensional characteristics.

The matting 12 of the present invention preferably is constructed to have a unit density of at least about 0.5 pounds per square yard, and more preferably, at least about 0.7 pounds per square yard.

Advantageously, the system 10 of the present invention has been found to promote the development of a relatively warmer, more humid microclimate beneath the matting 12, which encourages plant growth and seed germination, in comparison to prior art erosion control blankets.

The fiber matrix 22 comprises a plurality of randomly oriented elongated fibers or strands, for example, natural plant fibers. Other embodiments of the invention may include synthetic fibers, and other suitable fiber materials that are commercially available. In the presently described high velocity/high duration hydraulic event matting 12 of the present invention, the fiber matrix 22 preferably comprises a material selected from the group consisting of coconut fiber, flax fiber, chopped polypropylene fibers and combinations thereof. Other suitable natural or synthetic materials, for example hemp fibers, wood fibers, or plant straw, may alternatively be used.

The top net 18b and bottom net 18a preferably comprise a lightweight, grid-like netting material fastened to the fiber matrix 22, for example by machine stitching, for example at 1.5 inch centers. Bonding of the top net 18b and bottom net 18a to the fiber matrix may additionally be reinforced with deposits of a suitable adhesive.

Importantly, the flexible, two dimensional upper layer 16 is positioned to overlie and preferably closely conform to the core layer 14 to define a substantially flat upper surface of the matting being without substantial three dimensional features.

Figure 4:
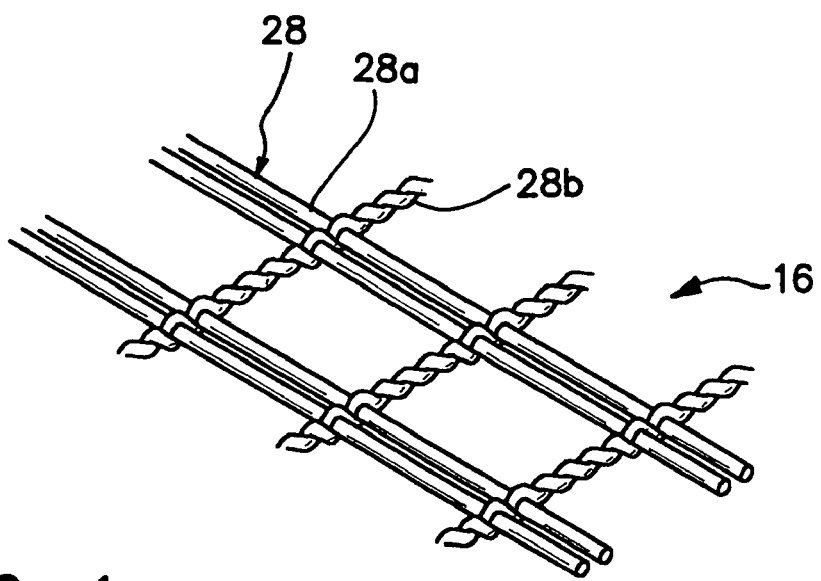
FIG. 4 shows a perspective view of an upper layer of the matting shown in FIG. 1.

The upper layer 16 of the matting 12 preferably comprises a high tensile strength, biaxial geogrid, such as shown in greater detail in FIG. 4. The geogrid is preferably "permanent" in that it is substantially not photodegradable, and comprises, for example, PVC coated, knitted polypropylene strands 28. Preferably, the strands 28 have a spacing distance in a range of between about 0.2 inches to about 2.0 inches, and more preferably in a range of between about 0.4 inches to about 1.0 inches. As shown, the strands 28 define a substantially two-dimensional grid configuration, for example of uniform, rectangularly shaped apertures. Other suitable materials of construction may be employed in upper layer 16.

More specifically, the upper layer 16 includes a first set of substantially parallel strands arranged perpendicularly across a second set of substantially parallel strands. More specifically, the first set of strands comprises doubled strands 16a, i.e. two strands arranged relatively close together in a side by side relationship. The second set of strands comprises twisted or helical strands 16b having a helix-like outer surface or substantially helical outer surface. In combination, the first set of strands 16a and the second set of strands 16b define a substantially planar surface, without any substantial three dimensional features or surface topography. Although a square or rectangular grid is described and shown, it should be appreciated that other two-dimensional configurations are possible.

During high velocity water flow, for example a flow of about 20 feet per second or greater, over an extended duration of time, for example of at least 50 hours or more, high shear stress forces are created. The matting 12 of the present invention has been found to have a superior capacity to withstand significantly greater shear stresses in comparison to conventional matting having higher roughness values.

Flatness, or roughness, of a surface, is a measurable quality. A degree of roughness of a surface is representable by a roughness coefficient known as Manning's "N" value. The Manning's "N" value of the present matting 12 is less than about 0.44, and more preferably is about 0.026. In addition to withstanding shear stress forces, the lack of three dimensional open spacing of the matting 12 preferably is effective to limit the amount of trapped soil and sediment which is desirable in many long duration, high flow applications.

In one embodiment of the invention, the upper layer 16 includes two distinct sets of strands 28, wherein a first set of strands 28a is arranged perpendicularly across a second set of strands 28b. More specifically, the first set of strands 28a comprises doubled strands, i.e. two strands arranged relatively close together in a side by side relationship. The second set of strands 28b comprises a single strand, for example a strand having a helix-like outer surface or substantially helical outer surface. Importantly, the first set of strands 28a and the second set of strands 28b define a substantially planar surface, without any substantial three dimensional features or surface topography. Although a square or rectangular grid is described and shown, it should be appreciated that other two-dimensional configurations are possible.

The biaxial geogrid 16 serves as a confinement structural layer for the fiber core 12 to prevent rupture or tearing thereof, particularly during extreme hydraulic activity (high velocity/high shear applications).

Assembly and manufacture of the matting 12 in accordance with the present invention may be accomplished using conventional equipment and methods. For example, the fiber matrix 22 is mechanically stitch bonded between the netting layers, 18a and 18b. The layers of netting, i.e. 18a and 18b, and fiber matrix 22 are all overlaid with the upper layer 16, for example the biaxial geogrid material hereinabove described All of the layers are then stitch bonded on 1.5 inch centers with UV stabilized polypropylene monofilament thread 20 to form the reinforcement matting 12. Alternately, or in addition, the upper layer 16 can be adhered to the layers of netting 18a and 18b and fiber matrix 22. Any suitable, preferably water resistant, adhesive may be employed. A number of such adhesives are well known and/or commercially available.

The matting 12 is preferably secured to the channel surface (or other surface) by means of 8 inch (minimum size) U-shaped staples 34, shown in FIGS. 1 and 3. The staples 34 are set to intersect the machine stitching and cross the strands 28 of the upper layer 16. Other suitable means may be employed for fixing the matting 12 to the soil surface. Advantageously, the matting of the present invention is substantially more flexible than conventional erosion control blankets, allowing the matting 12 to more closely conform to the contour of the slope or embankment surface to which it is installed.

The erosion control system 10 of the present invention minimizes erosion of a channel bed and other erosion prone surfaces, particularly when such surfaces are subjected to under continuous, high velocity flow conditions. Preferably, the matting is structured to withstand a liquid flow of between about 9.5 feet per second to about 20 feet per second for a duration of between about 30 minutes to a duration of about 50 hours.

EXAMPLE

As a specific example, an erosion control system in accordance with the present invention comprises a fiber matrix core layer 14 of 100% coconut fiber and a permanent (non photodegradable) polypropylene biaxial geogrid upper surface 16. The matting is further reinforced with an upper net 18a and bottom net 18b and a monofilament thread having a strength of at least about 1000 denier. The matting 12 in accordance with this specific example has a weight of about 0.95 pounds per square yard, a thickness of at least about 0.32 inches. Despite the In addition, the matting has a tensile strength of up to about 172.6 pounds per square foot, and an elongation of up to about 18.1 percent and a Mannings "N" value of about 0.026. It is noted that these parameters (tensile strength, elongation) are significantly higher than conventional erosion control blankets having a similar flexibility. When said matting 12 is placed on or secured to a severely sloped, unvegetated channel surface, the matting 12 withstands continuous high velocity flows of up about 18 feet per second for storm event durations of up to about 50 hours or more, including peak flows of up to 20 feet per second for short durations of up to about two hours.

Figure 5:
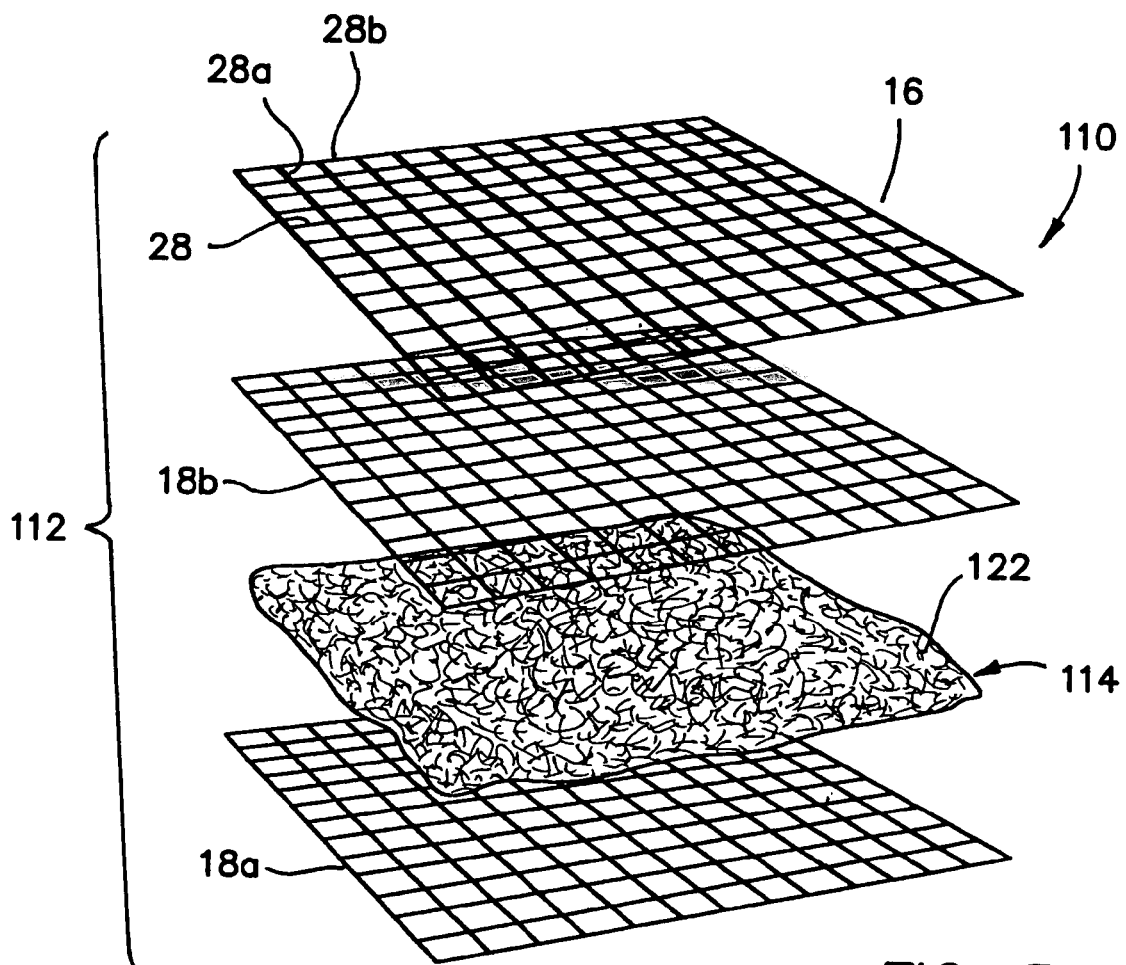
FIG. 5 shows an exploded view of another embodiment of the present invention.

Turning now to FIG. 5, another embodiment of the invention is shown generally at 110 (with like features being identified with like reference numerals increased by 100). The system 110 generally comprises a flexible matting 112 structured to be placed on or secured to a surface prone to erosion, the matting 112 including a core layer 114 formed of a fiber matrix 122 comprising randomly oriented plant fibers, wherein the plant fibers are effective in releasing effective amounts of beneficial nutrients to the surface upon decomposition of the plant fibers.

Preferably, the plant fiber matrix 122 has a nutrient content of at least about 0.6% potassium, about 1.25% nitrogen, and about 2.0% phosphate, based upon 100% dry matter, and is substantially absent of wheat straw, which is known to draw and nutrients from a soil surface upon decomposition of the wheat straw. Even more preferably, in this embodiment of the invention, the fiber matrix 122 comprises *Sorgum Sudanese*, i.e. Sudan straw, or Sudan grass.

During development of the present invention, Sudan grass was found to contain the highest amount of proteins and nutrients available to the soil upon decomposition thereof, including nitrogen, phosphorous, potassium, magnesium, calcium and zinc, in comparison to other plant fibers such as hemp, wood, and coconut. The three components of nitrogen, phosphorous and potassium are considered as macronutrients for sustaining plant growth and development.

Although FIG. 5 shows netting layers 18a and 18b and upper layer 16, it is noted that these features are not necessary and any suitable bonding means may be utilized in lieu thereof.

Figure 6:
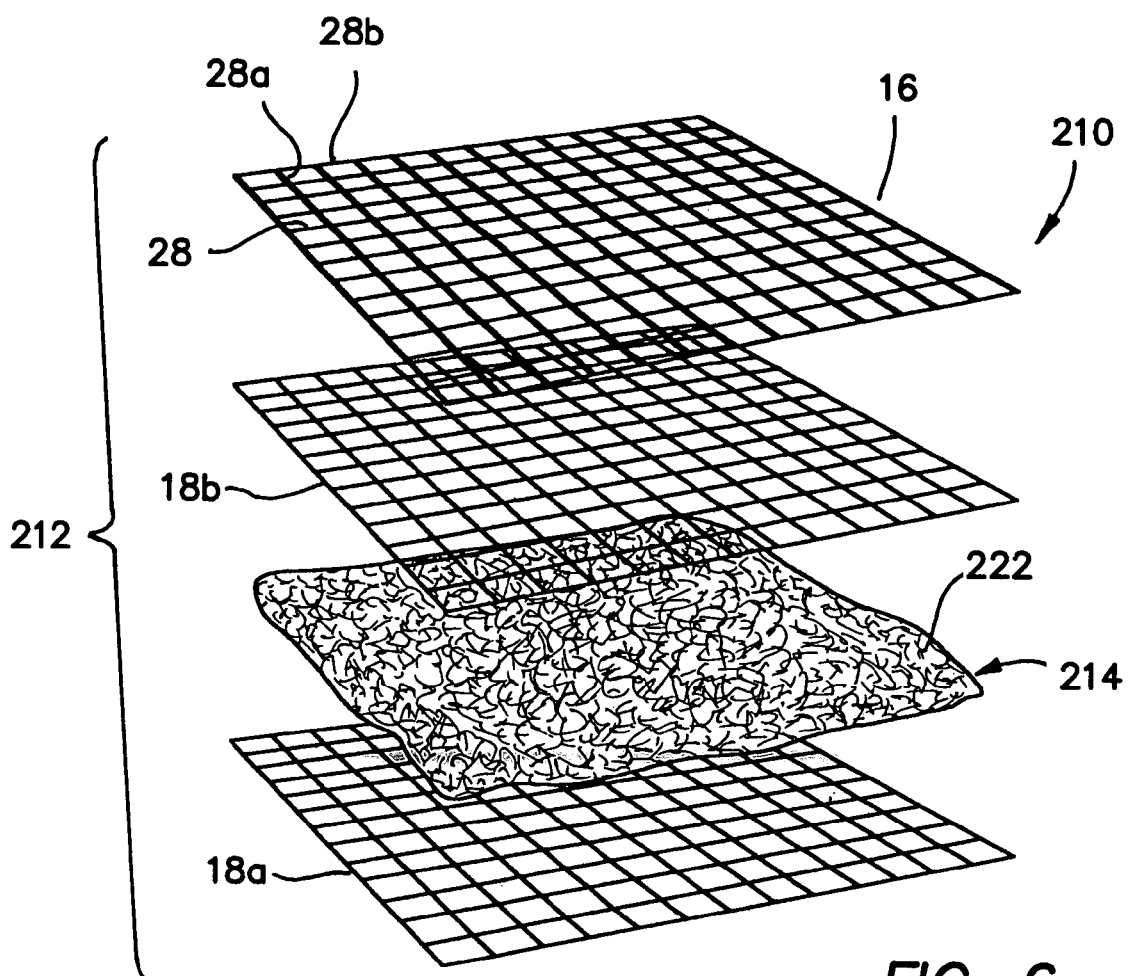
FIG. 6 shows an exploded view of yet another embodiment of the present invention.

In yet another embodiment of the invention, shown in FIG. 6, (with like features being identified with like reference numerals increased by 200), an erosion control system 210 is provided comprising a flexible matting 212 structured to be placed on or secured to a surface, for example a seeded surface prone to erosion. The matting 212 comprises a core layer formed of a matrix 214 of randomly oriented rice straw fibers, preferably California rice straw, a byproduct of the agricultural rice industry. This embodiment of the invention advantageously provides a naturally weed free, durable matting 212 that effectively promotes germination of seedlings and healthy growth of vegetation. The rice straw matrix 214 provides a high cover factor and a high silica content which effectively permits passage or projection of light while protecting the seed bed.

Although the present invention has been shown and described herein as being particularly advantageous for providing erosion prevention on sloped surfaces, the present invention is not limited to these particular applications, and other additional applications of the present systems 10, 110, and 210 are contemplated and are considered to be within the scope of the present invention.

Figure 7:
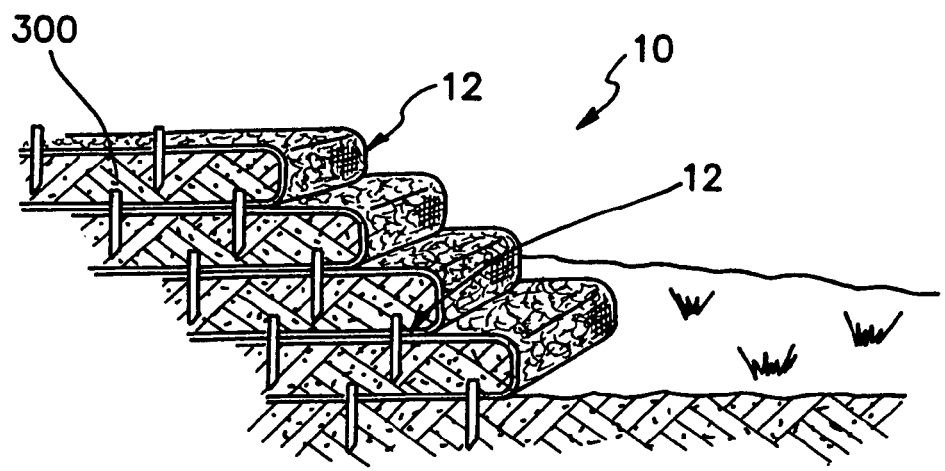
FIG. 7 shows the embodiment of the invention shown in FIG. 1 as installed in an alternative application, particularly embankment stabilization.

For example, turning to FIG. 7, the high velocity/high shear stress matting system 10 of the present invention is shown in as being used in an alternative application, particularly for embankment stabilization. Embankment stabilization is conventionally addressed by using a combination of practices such as geo grids with concrete block containment walls or geo cell grids, these practices being well known and understood by those of skill in the art. Advantageously, the high tensile strength of the high velocity/high shear stress embodiment 10 of the present invention effectively resists the tensile forces associated with containment of an embankment. By applying the matting 12 to an embankment 300 substantially as shown in FIG. 7, the system 10 effectively holds soil particles in place without allowing substantial filtering therethrough. Natural or planted vegetation becomes quickly established to further permanently reinforce the embankment 300 against all types of water erosion.

Any and all features described herein and combinations of such features are included within the scope of the present invention provided that the features of any such combination are not mutually inconsistent.

While this invention has been described with respect to various specific examples and embodiments, it is to be understood that the invention is not limited thereto and that it can be variously practiced within the scope of the following claims.

What is claimed is:

1. An erosion control system comprising:
    a flexible erosion control matting including no powdered or granular water absorbent material, and further including
    a single core layer comprising randomly oriented fibers, and forming a substantially flat upper surface and a substantially flat lower surface;
    an externally disposed biaxial geogrid material fastened to and located on the substantially flat upper surface of the single core layer; and
    an externally disposed grid-like netting material fastened to and located on the substantially flat lower surface of the single core layer;
    the biaxial geogrid material being physically different in structure from the grid-like netting material; and
    the flexible erosion control matting structured to resist trapping of sediment within the matting and to allow flowing particulate matter to pass freely over the matting during a hydraulic event in order to control erosion of a substantially unvegetated sloped surface when the matting is placed on a substantially unvegetated sloped surface.

2. The system of claim 1 wherein the single core layer comprises a compacted fiber matrix.

3. The system of claim 1 wherein the matting has a density of at least about 0.5 pounds to about 0.7 pounds per square yard.

4. The system of claim 1 wherein the matting has a Mannings "N" value of roughness of less than about 0.044.

5. The system of claim 1 wherein the matting has a Mannings "N" value of roughness of about 0.026.

6. The system of claim 1 wherein the flexible erosion control matting is structured to prevent substantial soil loss from the sloped, unvegetated surface when the surface is exposed to a liquid flow at a velocity of greater than about 9.5 feet per second and less than about 20 feet per second.

7. The system of claim 1 wherein the flexible matting is structured to prevent substantial soil loss from the sloped, substantially unvegetated surface when the surface is exposed to a liquid flow having a duration greater than about 30 minutes to about 50 hours.

8. The system of claim 1 wherein the single core layer comprises a material selected from the group consisting of coconut fibers, flax fibers, polypropylene fibers and combinations thereof.

9. The system of claim 1 wherein the biaxial geogrid is stitch bonded with the single core layer.

10. The system of claim 1 wherein the single core layer has a substantially continuous, uniform thickness defined between the substantially flat upper surface and the substantially flat lower surface.

11. The system of claim 1 wherein the flexible matting is further structured such that the biaxial geogrid material remains bonded to the substantially flat upper surface of the single core layer.

12. The system of claim 1 wherein the flexible matting consists essentially of
   the single core layer;
   the biaxial geogrid material, fastened to and located on the single core layer; and
   the externally disposed grid-like netting material fastened to and located on the substantially flat lower surface of the single core layer.

13. The system of claim 1 wherein the biaxial geogrid material and the netting material are different in structure in that the biaxial geogrid is formed of strands having a substantially uniform first transverse cross-sectional area, and the netting material comprises strands having a substantially uniform second transverse cross sectional area, and the first transverse cross sectional area is larger in size than the second transverse cross sectional area.

14. The system of claim 1 wherein the biaxial geogrid material is formed of woven polypropylene strands.

15. The system of claim 1 wherein the biaxial geogrid is formed of coated polypropylene strands.

16. The system of claim 1 wherein the biaxial geogrid is formed of PVC coated polypropylene strands.

17. The system of claim 1 wherein the biaxial geogrid is non-photodegradable.

18. The system of claim 1 wherein the biaxial geogrid is formed of at least one of doubled strands and helical strands.

19. An erosion control system comprising:
   a flexible erosion control matting including no powdered or granular water absorbent material, and further including
   a single core layer comprising randomly oriented fibers selected from the group consisting of coconut fibers, wood fibers, plant straw, and combinations thereof, the single core layer forming a substantially flat upper surface and a substantially flat lower surface;
   a biaxial geogrid material having no substantial three dimension features, the biaxial geogrid fastened to and conforming to the substantially flat upper surface of the single core layer; and
   a grid-like netting material fastened to the substantially flat lower surface of the single core layer;
   the biaxial geogrid material being physically different in structure from the grid-like netting material; and
   the flexible erosion control matting structured to resist trapping of sediment within the matting and to allow flowing particulate matter to mass freely over the matting during a hydraulic event in order to control erosion of a substantially unvegetated sloped surface when the matting is placed on a substantially unvegetated sloped surface.

20. The system of claim 19 wherein the flexible erosion control matting has a density of at least about 0.5 pounds per square yard.

* * * * *